Feb. 23, 1954 W. J. CRAVER 2,670,052
SINGLE WHEEL GARDEN AND TRUCK TRACTOR DRIVE
Filed June 28, 1951 2 Sheets-Sheet 1

William J. Craver
INVENTOR.

BY *Clarence A. O'Brien*
*and Harvey B. Jackson*
Attorneys

Feb. 23, 1954 W. J. CRAVER 2,670,052
SINGLE WHEEL GARDEN AND TRUCK TRACTOR DRIVE
Filed June 28, 1951 2 Sheets-Sheet 2
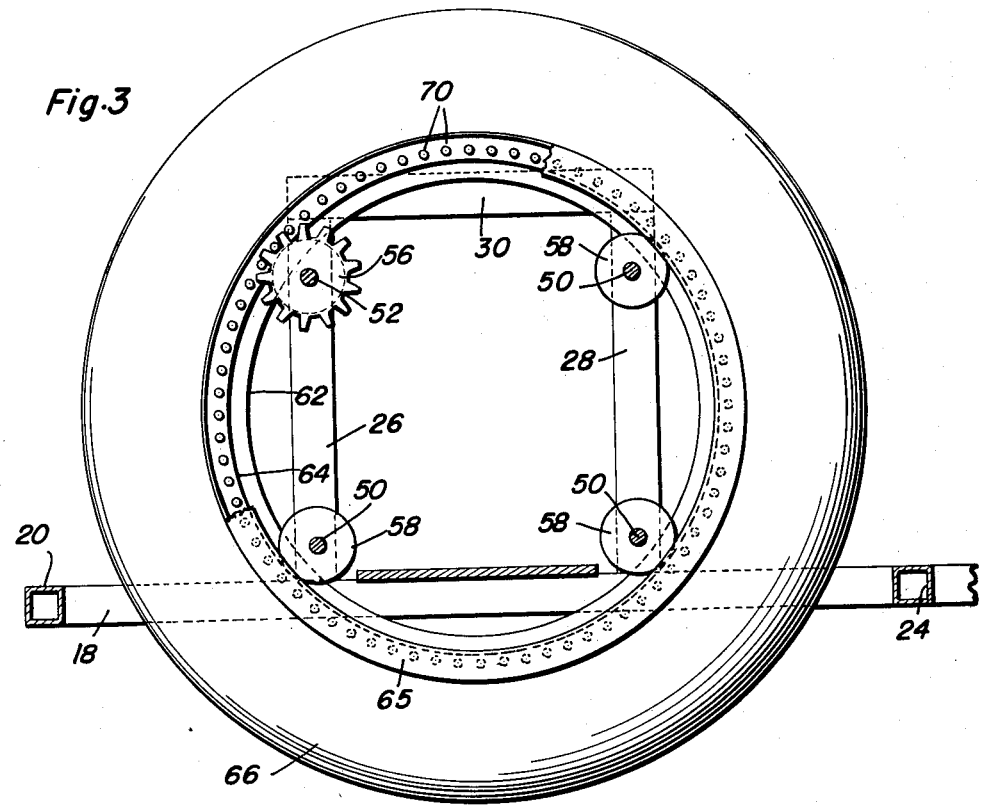
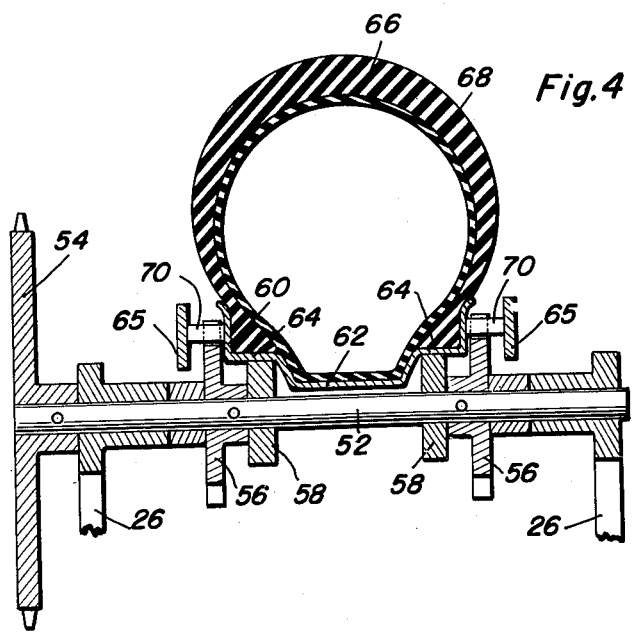
William J. Craver
INVENTOR.

Patented Feb. 23, 1954

2,670,052

UNITED STATES PATENT OFFICE 2,670,052

SINGLE WHEEL GARDEN AND TRUCK TRACTOR DRIVE

William J. Craver, Fayetteville, Ohio

Application June 28, 1951, Serial No. 233,993

1 Claim. (Cl. 180—10)

This invention comprises novel and useful improvements in a garden and truck tractor and more specifically pertains to a light weight garden tractor of the type comprising a single wheel together with handles for maneuvering the tractor.

The primary object of this invention is to provide an improved garden tractor and especially to improve the power or driving means of the tractor.

A further important object of the invention is to provide an improved arrangement of a power plant and traction wheel for the tractor wherein the traction wheel surrounds and is rotatable about the power plant and is driven thereby in a novel manner.

A still further object of the invention is to provide an improved garden tractor of the character above set forth wherein the controls of the power plant may be conveniently mounted upon the handles of the tractor; wherein the single wheel of the tractor, constituting a traction wheel, is rotatively mounted about the power plant and driven thereby in an improved manner.

These, together with various ancillary features and objects of the invention, which will later become apparent as the following description proceeds, are attained by the present invention, a preferred embodiment of which is being illustrated, by way of example, in the accompanying drawings, wherein.

Figure 1:
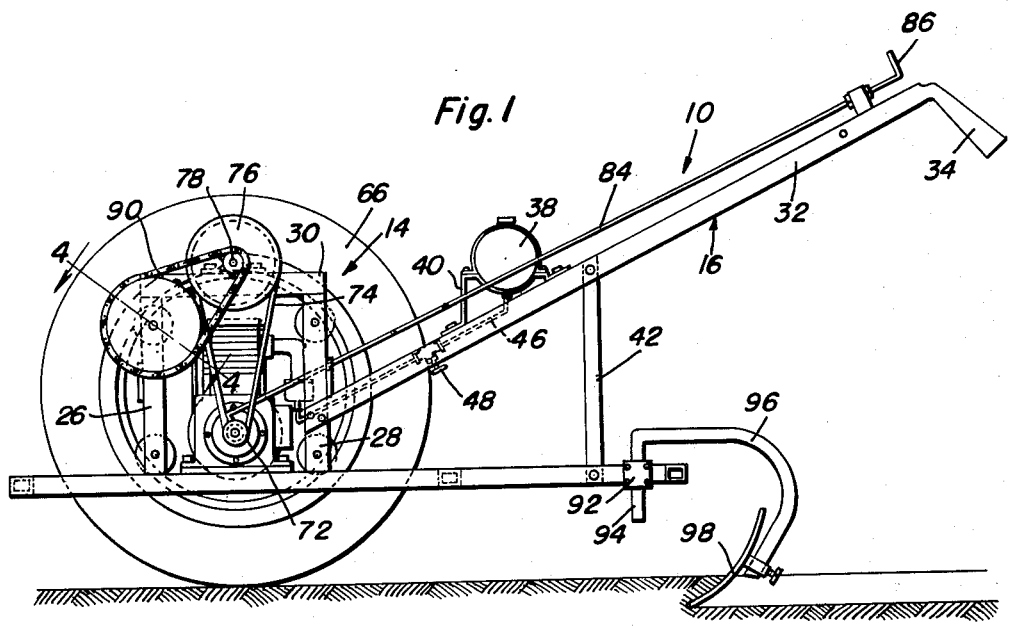
Figure 1 is a side elevational view of an illustrative embodiment of the principles of this invention.

Figure 3 is a side elevational view, upon an enlarged scale, parts being broken away and shown in section, of the mechanism for rotatively supporting and driving the traction wheel of the tractor; and Figure 4 is a sectional detail view taken substantially upon the plane indicated by the section line 4—4 of Figure 1 and showing further details of the mounting and driving means for the traction wheel.

Referring now more specifically to the accompanying drawings, wherein like numerals designate similar parts throughout the various views, it will be seen that the improved farm tractor in accordance with this invention is indicated generally by the numeral 10. The tractor includes a frame work consisting of a base indicated generally by the numeral 12, supporting standards indicated generally by the numeral 14 and mounted upon the base, together with a handle assembly indicated generally by the numerals 16.

The base 12 consists of an open frame work comprising a pair of longitudinal horizontally disposed frame members 18 which are connected across their ends by transverse members 20 and 22 at the front and rear ends respectively, and by intermediate transverse members 24 as desired. The base thus constitutes an open supporting frame work of light weight, and which may conveniently be formed of tubular members as illustrated.

A standard 14 is provided upon each of the longitudinal members 18 each standard consisting of a pair of vertical members 26 and 28 connected across their tops by a longitudinal top member 30.

The handle assembly 16 comprises a pair of rearwardly diverging and upwardly inclined handle bars 32, which at their lower or inner ends are secured to the standard members 28 in any convenient manner, and are provided at their upper ends with hand grip portions 34 with a transverse brace member 36. Conveniently, a gasoline tank 38 may be mounted by suitable brackets 40 upon the handle bars 32, in a convenient position thereon. The handle bars are braced upon the horizontal frame members 18 of the base as by upstanding brackets 42.

Mounted in a convenient manner upon the base and between and carried by horizontal frame members 18 thereof, is a motor 44 of any desired type, which may conveniently comprise an air cooled internal combustion engine of a conventional and known type, and which may be supplied by fuel from the tank 38 as by the fuel line 46 and the hand control valve 48 thereof. Suitable controls, not shown, may be connected with the throttle valve of the engine and may be conveniently mounted upon one of the handle bars 32 for easy manipulation by the operator.

Four axles 50, 50, 50 and 52 are journalled between the standard members 26, 26 and 28, 28, these axles being disposed in parallel relation and extending transversely of the frame and surrounding and being disposed upon opposite sides of the engine 44. The axle 52, constitutes the drive shaft of the tractor, and is journalled adjacent the upper end of the pair of standards 26 on the two horizontal frame members 18. Upon one end, the drive shaft 52 is provided with a driving sprocket gear 54, and between the standard members 26 is provided with a pair of sprocket gears 56. Disposed between the sprocket gears 56 are a pair of supporting rollers 58, all these members being fixedly secured to the drive shaft 52. The other shafts 50 are identical with the shaft 52 except that the sprocket gears 54 and 56 are omitted therefrom.

The tractor is provided with a single wheel which constitutes its sole supporting and traction means. This wheel may conveniently comprise an annular rim 60 having an annular drum center portion 62 upon the opposite sides of which are provided annular bearing shoulders 64. A conventional rubber tire and tube 66 and 68 respectively are mounted upon the rim in the usual manner.

The parts are so proportioned and so arranged that the rim surrounds the internal combustion engine and has its drop center portion 62 disposed between the pairs of rollers 58 on each of the four shafts, and has its journalled or bearing shoulders 64 revolubly mounted upon the rollers 58.

In order to drive the traction wheel, the opposite sides of the rim 60 are provided with sets of laterally outwardly extending pins 70. These pins are disposed for engagement by the sprocket gears 56 whereby when the drive shaft 52 is rotated and subsequently set forth, positive rotation will be imparted to the traction wheel.

Figure 2:
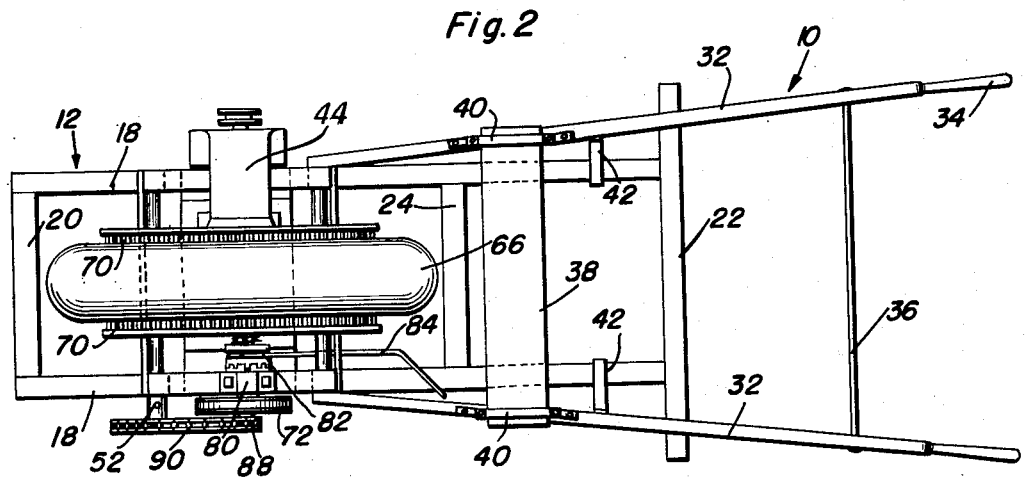
Figure 2 is a top plan view of the arrangement of Figure 1, part of the control mechanism being omitted in the interest of clarity.

A reduction gearing connecting means is provided for operatively connecting the drive shaft of the motor 44 with the drive shaft 52 of the traction wheel. This connecting means may conveniently comprise a drive pulley 72, see Figures 1 and 2, which is operatively connected with a driving belt 74 with a driven pulley 76 carried by a shaft 78 mounted in suitable journal boxes or bearings 80 upon a top member 30 of the standards. A conventional form of clutch member, indicated generally by the numeral 82 is operatively interposed between the pulley 72 and the shaft of the motor, whereby the motor may be selectively connected with or disconnected from the driving pulley 72. This clutch member 82 is provided with a control part 84 having a handle portion 86 secured to the upper end of the tractor frame handle 32 as shown in Figure 1.

The shaft 78 is provided at its extremity with a sprocket gear 88, and the same is connected by a sprocket chain 90 to the above mentioned driving sprocket 54. It will thus be apparent that there is provided a reduction gearing assembly whereby the power of the motor 44 is transmitted directly to the rim 60 of the traction wheel 66 through the control of a clutch member.

Various agricultural implements may be mounted upon the base 12 of the tractor, or upon the rearward transverse bar 22 which may constitute an implement or draw bar of the tractor. One suggested means for mounting implements may comprise clamping brackets 92 adjustably securing the shank portions 94 of implement holders 96 to the frame of the tractor, the implement holders being provided with various selected implements such as is indicated at 98.

From the foregoing, it will be apparent that the arrangement of the single wheel of the tractor about the power plant will materially reduce the over-all dimensions of the machine enabling the same to be conveniently manipulated in gardens or the like between close rows of produce. Moreover, it will be apparent that the shaft of the motor, the supporting shafts and the driving shaft of the traction wheel are all disposed eccentrically of the axes of rotation of the same, thereby enabling the device to be greatly lowered with respect to its center of gravity.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is:

A garden tractor comprising a frame, a motor mounted on said frame, parallel axles journaled on said frame, pairs of supporting rollers on said axles, a traction wheel surrounding said motor and axles and having a rim revolubly mounted on said pairs of rollers, an annular series of pins extending laterally from each side of said rim and constituting driving means therefor, and connecting means operatively interposed between said motor and said series of pins, one of said axles constituting a drive shaft and having a pair of gears each engaging one of said series of pins, said connecting means engaging said drive shaft, said connecting means including a speed reduction gearing, said traction rim having an annular drop center and annular bearing shoulders on opposite sides of said drop center, said rollers of each pair engaging said bearing shoulders, said shoulders being between said pins and said drop center.

WILLIAM J. CRAVER.

References Cited in the file of this patent
UNITED STATES PATENTS

| Number | Name | Date |
|---|---|---|
| 1,275,106 | Trussell | Aug. 6, 1918 |
| 1,282,329 | Turner | Oct. 22, 1918 |
| 1,322,028 | Lehman et al. | Nov. 18, 1919 |
| 1,819,924 | Seppola | Aug. 18, 1931 |
| 2,042,714 | Hunt | June 2, 1936 |
| 2,545,781 | Hesterberg | Mar. 20, 1951 |